Dec. 20, 1938.   J. S. COLEMAN   2,140,496
SAW CONSTRUCTION
Filed May 11, 1936    2 Sheets-Sheet 1
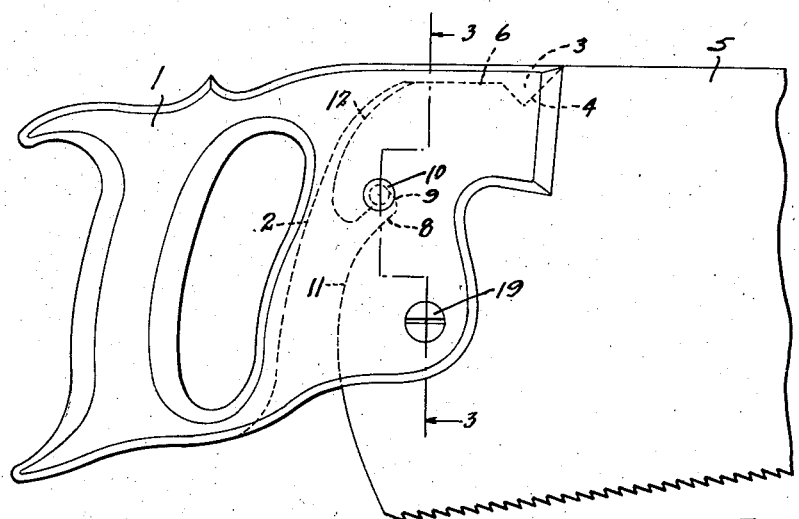
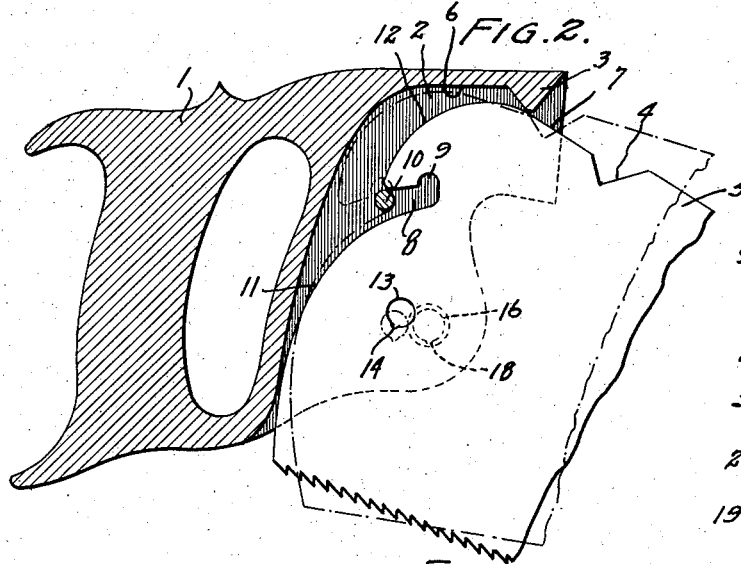
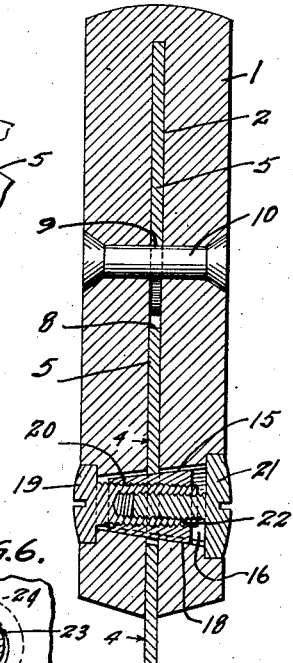
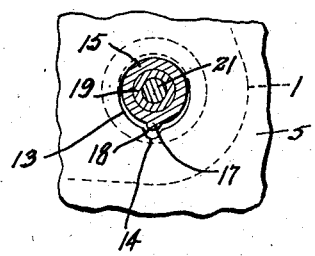
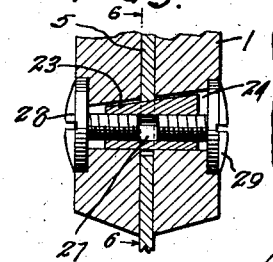
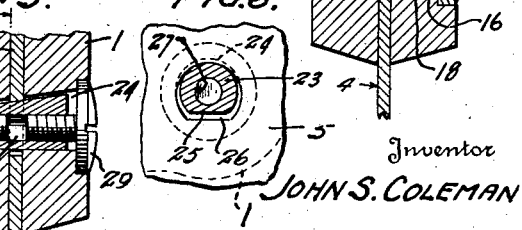
Inventor
JOHN S. COLEMAN
By Semmes & Semmes
Attorneys Dec. 20, 1938.   J. S. COLEMAN   2,140,496
SAW CONSTRUCTION
Filed May 11, 1936    2 Sheets—Sheet 2
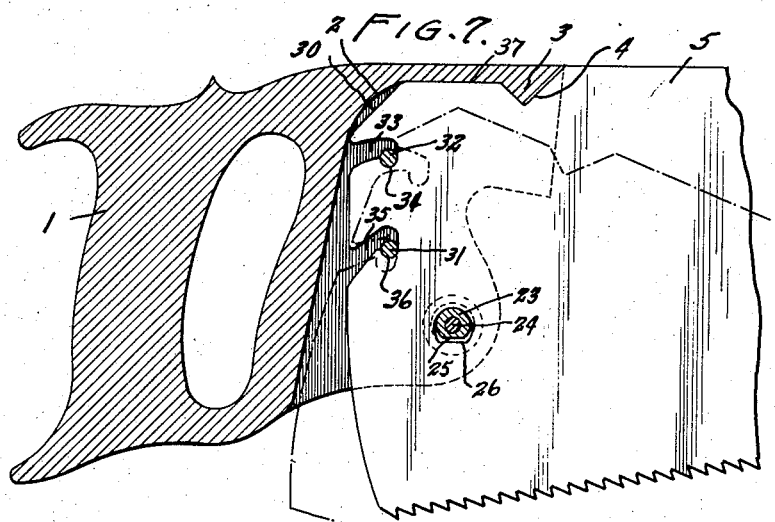
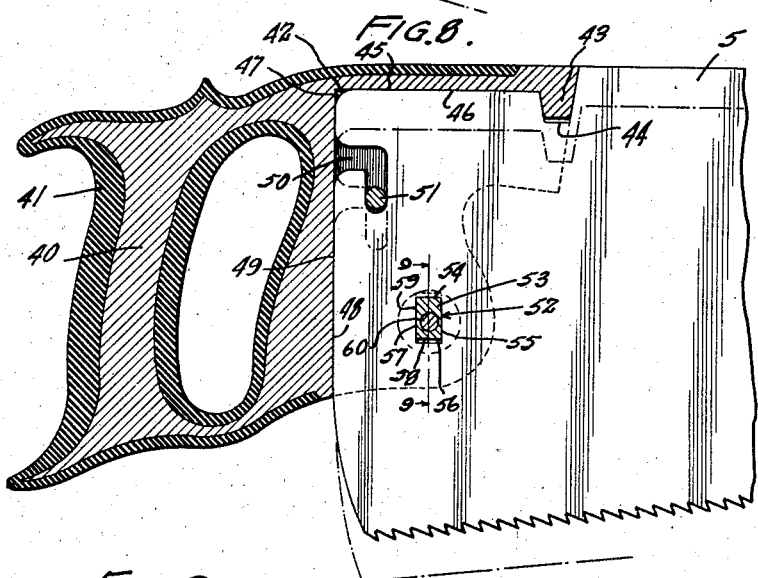
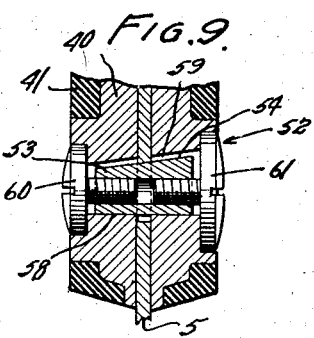
Inventor
JOHN S. COLEMAN
By Semmes & Semmes
Attorney Patented Dec. 20, 1938

2,140,496

UNITED STATES PATENT OFFICE 2,140,496

SAW CONSTRUCTION

John S. Coleman, Birmingham, Ala.

Application May 11, 1936, Serial No. 79,165

2 Claims. (Cl. 145—113)

My invention relates to saws, and in particular to saw constructions of the cross-cut saw type.

The holding of the blade in the saw handle to keep the two relatively immovable during use has always been a difficult problem. Often numerous screws and bolts are inserted in the handle to pass through the blade, and sometimes one or more of them working loose will permit the blade and handle to have relative movement while the saw is being used.

An object of my invention is to provide a construction which is simple, cheap, and positive in operation, and which will hold the saw handle and blade relatively immovable.

A further object of my invention is to provide a construction which is cheap and easy to manufacture, and in which the blade can be easily placed in the handle or removed therefrom.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings,

Figure 1 is a side elevation of one form of my invention showing the position of the saw blade in dotted lines;

Figure 2 is a sectional view showing the blade during insertion in the handle;

Figure 3 is a view taken along the line 3—3 of Figure 1, looking in the direction of the arrows;

Figure 4 is a detailed sectional view taken along the line 4—4 of Figure 3, looking in the direction of the arrows;

Figure 5 is a sectional detail view of a modification of the wedging devices shown in Figures 3 and 4;

Figure 6 is a view taken along the line 6—6 of Figure 5, looking in the direction of the arrows;

Figure 7 is a view, partly in section, showing a modification of the handle and blade construction, the position of the blade with respect to the handle during removal being indicated in dotted lines;

Figure 8 is a view similar to Figure 7 of a different modification of my device, the position of the blade with respect to the handle during removal being indicated by dotted lines;

Figure 9 is a view of a modification of the wedging device, such view being taken along the line 9—9 of Figure 8, looking in the direction of the arrows.

Figure 1 shows a saw handle 1 which may be made of metal or other light and durable material. The saw handle 1 is provided with a slot 2 having a downwardly projecting locking member 3 which is adapted to fit within a recess 4 formed in the blade 5. The top of the slot 2, as is indicated at 6, is adapted to contact with a flat portion 7 of the saw blade 5. This construction permits the saw blade 5 to be forced against the top of the recess 2 to hold the saw blade and the handle relatively immovable during use. In order to lock the saw blade in the handle, I have provided the saw blade with a recess 8 having an upwardly projecting portion 9. A lug 10 which extends through the slot and is affixed in the handle 1 is adapted to slide within the recess 8 and to rest in the portion of the recess 9 when the saw blade is locked within the handle 1.

The motion of the saw blade 5 in the handle 1 in inserting the saw blade in the handle is shown in Figure 2. The saw blade is provided, as shown, with a rounded edge 11 and another rounded edge 12. These rounded edges permit the saw blade to be locked around the lug 10 to fit it tightly in place against the top of the slot 2.

In order to force the saw blade upwardly against the interior of the slot 2, I have provided the blade with an aperture 13 provided with a niche 14. A wedging member 15 is adapted to fit within a recess 16 formed in the saw handle. The wedging member 15 is provided with a ridge 17, which fits within the niche 14 of the aperture 13. The ridge 17 fits also within a groove 18 formed in the aperture 16.

In order to tighten up the wedge 15 to make it press upwardly against the saw blade, I have provided a screw 19 which fits within screw threads 20 within an interior aperture made in wedge member 15.

By tightening up the screw 19, the wedge member 15 is caused to slide in the aperture 16 and to wedge upwardly against the saw blade 5.

In order to hold the screw 19 and wedge 20 in fixed relationship, I have shown a locking screw 21 which fits within a screw threaded aperture 22 in the screw 19. By tightening up screw 21 the ensemble can be locked tightly in place, and there is no danger of loosening of the wedging action during use. The ridge 17 prevents rotation of the wedge 15 during either tightening or loosening of the wedge in its pressure against the blade 5.

It can thus be seen that there is a single removable assembly necessary in order to firmly secure the blade in the handle. The wedging action of the wedge member 15 jams the blade tightly against the top of the aperture 2, and the blade is held firmly in place. The lug 10 which is permanently in place and not removable in the handle subserves a secondary bracing function. The rounded edge 12 permits the ready removal of the blade from the handle upon removal of the wedging assembly.

In Figures 5 and 6 I have shown a modification of the wedging assembly illustration in Figures 3 and 4. Here I have shown a wedge element 23 which lies within an aperture 24 in the handle. The wedge element 23 is conical, as indicated in Fig. 6, and has one flat side 25 which lies against a flat portion 26, of the aperture 24. Wedge member 23 has screw threaded aperture 27 and a tightening screw 28 on one side which causes the wedge 23 to bear against the blade 5 and wedge it in place. Another screw element 29, which lies within the screw threaded aperture 27, acts to tighten up the assembly and to maintain the adjustment.

In Figure 7 I have shown a saw blade 5 formed with a slanted cut-away portion 30 at its upper rear, and which permits the blade 5 to be rotated around a lug 31 as a pivot. There is another lug 32 formed also in the handle 1. The lug 32 fits within cut-away portion 33 provided at the back of the saw blade 5. This cut-away portion 33 has a downwardly projecting recess 34. The saw blade is provided with another recess 35 in which the lug 31 is adapted to pass. The recess is embodied with a downwardly extending portion 36 which, in the fixed position of the saw, bears against lug 31.

The cut-away portion 30 of the saw blade permits rotation of the blade 5 around the lug 31 as a pivot to remove it from the handle. The saw blade 5 is provided with a flat surface 37 which is adapted to bear against the top of the slot 2. The slot 2 is provided with a downwardly extending locking member 3, similar to that shown in Figures 1 and 2, and a notch or recess 4 is formed in the saw blade 5 to cooperate with the locking member 3.

In this form shown in Figure 7, the wedging assembly is similar to that already described in connection with Figures 5 and 6.

In Figure 8 I have shown yet another form of handle and blade. The handle can be formed of a metal or other similar light, strong material which is in the form of a core 40 which may be covered with a rubber outside which is suitably attached to the core 40. The core 40 is provided with a slot 42 which may have a right angular configuration. Into slot 2 extends a locking element 43 which may have a flat lower surface. The blade 5 is formed with a notch 44 of a shape to cooperate with a locking member 43. The blade is not provided with a rounded upper surface or an upper surface having a slanted cut-away portion, but is provided with a relatively long flat surface 45 which fits against a flat surface 46 formed at the top of the slot 42. The tip of the blade inside the handle, as indicated at 47, may be slightly rounded.

The blade 5 is formed with a surface 48 approximately at right angles to the surface 45 and which lies flush with the surface 49 formed on the core 40. A right angular recess 50 is formed in the blade 5 in which is adapted to fit a lug 51 which passes through the slot 42 formed in the core 40.

In inserting the blade, the parts are put in the position shown in dotted lines in Figure 8, and the lug 51 is inserted in the recess 50 formed in the saw blade. The parts are given a motion such as to cause lug 51 to pass through the right angular configuration of the recess and assume the position illustrated in the unbroken lines in Figure 8.

A wedging assembly which I have indicated generally by the numeral 52 is then adapted to be tightened up to wedge blade 5 firmly against the top of the slot 42 to hold the parts relatively immovable. The wedging assembly 52 is illustrated in detail in Figure 9 and comprises wedge element 53 which has a slanted upper surface 54 and which is provided with three other flat surfaces 55, 56 and 57. The surface 54 of the wedging element 53 is adapted to bear against a bottom 58 of an aperture 59 formed in the core 40. The wedge member 53 is screw threaded in its interior and can be tightened into place by the action of the screw 60. Another screw 61 is adapted to act as a holding member to hold the parts adjusted and to tighten up the assembly. The screw 61 also fits within a screw threaded aperture in the interior of the wedge element 52.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A saw having a blade, a handle, and means to wedge the blade against the handle comprising a movable wedge member adapted to be slid to press against the blade, and a screw on one end of the wedge member to slide it against the blade and a screw on the other end of the wedge member to tighten the wedge in place.

2. A saw comprising a handle with a slot therein, a downwardly projecting locking member in said slot, a blade with a cut-away portion therein cooperating with the locking member, a lug in the slot, a recess in the blade into which the handle fits and of substantially right angular outline to permit removal of the blade by downward motion thereof to free the locking member and the cut-away portion in the blade, and wedging means extending through the handle and the blade to hold the locking member, the cut-away portion of the blade, and the lug and recess in tight engagement.

JOHN S. COLEMAN.